US009856993B2

(12) United States Patent
Fuchs et al.

(10) Patent No.: US 9,856,993 B2
(45) Date of Patent: Jan. 2, 2018

(54) VALVE DEVICE WITH A VALVE BASED ON AN ELECTRODYNAMIC ACTUATOR AND METHOD FOR CONTROLLING A VALVE WITH AN ELECTRODYNAMIC ACTUATOR

(71) Applicant: Buerkert Werke GmbH, Ingelfingen (DE)

(72) Inventors: Maik Fuchs, Dresden (DE); Ralf Scheibe, Kuenzelsau OT Garnberg (DE); Sebastian Kahl, Forchtenberg (DE)

(73) Assignee: Buerkert Werke GmbH, Ingelfingen (DE)

( * ) Notice: Subject to any disclaimer, the term of this patent is extended or adjusted under 35 U.S.C. 154(b) by 79 days.

(21) Appl. No.: 14/954,182

(22) Filed: Nov. 30, 2015

(65) Prior Publication Data

US 2016/0153577 A1   Jun. 2, 2016

(30) Foreign Application Priority Data

Dec. 2, 2014   (DE) .................. 10 2014 117 656

(51) Int. Cl.
*F16K 31/06* (2006.01)
*H01F 7/06* (2006.01)
(Continued)

(52) U.S. Cl.
CPC ...... *F16K 31/0675* (2013.01); *F16K 31/0682* (2013.01); *F16K 31/082* (2013.01);
(Continued)

(58) Field of Classification Search
CPC ............. F16K 31/0675; F16K 31/0682; F16K 31/0686; F16K 31/082; H01F 7/066; H01F 7/1816; H01F 7/1822
(Continued)

(56) References Cited

U.S. PATENT DOCUMENTS 5,470,043 A * 11/1995 Marts .................... F16K 31/082
251/129.01
6,726,173 B2 * 4/2004 Hettinger ............ F16K 31/0682
251/129.17

(Continued)

FOREIGN PATENT DOCUMENTS

DE   29608622 U1   8/1996
DE   69306056 T2   3/1997
(Continued)

OTHER PUBLICATIONS

German Search Report in DE 10 2014 117 656.1 dated Aug. 31, 2012.

*Primary Examiner* — Ian Paquette
(74) *Attorney, Agent, or Firm* — Dilworth IP LLC

(57) ABSTRACT

A valve device includes a valve having an electrodynamic actuator. The electrodynamic actuator includes a movably mounted control element having a coil and a magnet arrangement immovable relative to the coil. A driving force caused by energization of the coil and transmitted to the control element substantially is linearly dependent on the current intensity. A front-end electronic unit is connected with the coil and includes a capacitor connected in parallel to the coil. A method for controlling a valve as mentioned above provides that, upon actuation of the electrodynamic actuator, during energization of the coil by a voltage source, a capacitor connected in parallel to the coil is charged. After termination of the energization by the voltage source, the coil is energized further by a discharge of the capacitor.

18 Claims, 3 Drawing Sheets

(51) Int. Cl.
*H01F 7/18* (2006.01)
*F16K 31/08* (2006.01)

(52) U.S. Cl.
CPC ........... *H01F 7/066* (2013.01); *H01F 7/1816* (2013.01); *H01F 2007/1822* (2013.01)

(58) Field of Classification Search
USPC .................................................. 251/129.15
See application file for complete search history.

(56) References Cited

U.S. PATENT DOCUMENTS

| | | | |
|---|---|---|---|
| 6,966,325 B2 | 11/2005 | Erickson | |
| 7,823,860 B2* | 11/2010 | Ueda | F02D 41/20 251/129.04 |
| 2012/0153303 A1* | 6/2012 | Uchida | H01L 29/41766 257/77 |
| 2014/0158205 A1* | 6/2014 | Tanabe | F02D 41/3845 137/1 |
| 2015/0069860 A1* | 3/2015 | Reiter | F04B 19/006 310/12.16 |

FOREIGN PATENT DOCUMENTS

| | | |
|---|---|---|
| DE | 19753369 C2 | 6/1999 |
| DE | 102010046977 A1 | 9/2011 |

* cited by examiner

VALVE DEVICE WITH A VALVE BASED ON AN ELECTRODYNAMIC ACTUATOR AND METHOD FOR CONTROLLING A VALVE WITH AN ELECTRODYNAMIC ACTUATOR

TECHNICAL HELD

The invention relates to a valve device which comprises a valve with an electrodynamic actuator. The invention furthermore relates to a method for controlling a valve with an electrodynamic actuator.

BACKGROUND OF THE INVENTION

With the increasing demands in apparatus engineering, the demands on the valves used therein also are increasing. In modern laboratories, for example, and in particular in the clinical area directly in the patient environment, the avoidance or reduction of noise pollution gains in importance more and more. Especially for the field of "media-separated" valves, as they are used e.g. in food, analysis, laboratory and medical technology, only few low-noise solutions do exist on the market.

For many of the above-mentioned applications, solenoid valves are the first choice from a technical point of view. They are designed for fast cycle duties and with a corresponding design are suitable for aggressive or neutral liquid and gaseous media in various temperature and pressure ranges. A solenoid valve usually comprises a magnetic armature (core) which is movable in one direction of movement by the force of an electromagnet and in the opposite direction by the force of a return spring. On energization of the electromagnet, the armature is accelerated from the starting condition by the magnetic field generated, until it reaches an end position specified by a limit stop, usually a metal plug. In the course of the switching path, the speed of the armature is increasing steadily. The magnetic force becomes the larger the closer the armature comes to the plug. At the end of the switching path, when the armature hits the plug, a distinctly perceptible clicking noise is heard, which mostly is perceived as disturbing, in particular when the switching frequency is high. Noise damping can be achieved by an elastomer element mounted on the plug or armature. However, this measure leads to a reduced stroke of the armature and to a reduced driving force at the end of the stroke path.

In the above-mentioned field of the media-separated valves, a valve type which here briefly is referred to as "Lorentz valve" recently is establishing itself. In this valve type, which is known for example from WO 2010/066459 A1, an electrodynamic actuator is employed. On energization of a coil, a stationary magnet arrangement exerts a Lorentz force on the coil, which is utilized for deflecting a mechanically pretensioned control element. A prerequisite for this is that the coil is part of the movable control element. In contrast to a solenoid valve, the driving force in a Lorentz valve is linearly dependent on the current intensity, i.e. with constant current intensity the driving force remains constant. Such valve mostly is less noisy, because there is no impact of the control element on a metallic limit stop. On switching, however, a noise will yet be heard, when the control element or a tab of the control element hits a valve seat.

BRIEF DESCRIPTION OF THE INVENTION

It is an object of the invention to create a directly acting valve with an improved switching characteristic. In particular, an effective end position damping and/or accelerated switching is to be achieved.

The valve device according to the invention comprises a valve having an electrodynamic actuator which includes a movably mounted control element having a coil and a magnet arrangement immovable relative to the coil. A driving force caused by energization of the coil and transmitted to the control element substantially is linearly dependent on the current intensity. According to the invention, a front-end electronic unit connected with the coil includes a capacitor connected in parallel to the coil.

The invention is based on the finding that the particular construction of a Lorentz valve provides for a steady switching movement controllable via the electric current. On energization of the coil, the capacitor connected in parallel to the coil is charged and after switching off the current serves as buffer which prevents that the coil abruptly becomes currentless and the control element is returned into the starting condition unbraked. After switching off the current, the capacitor still supplies the coil with current, until it is discharged completely. With the damping thus achieved, the exponential discharge curve of capacitors turns out to be particularly advantageous, as the discharge of the capacitor especially at the end of the switching path is slowed down into the starting condition. With a suitable design of the capacitor used, in particular with regard to its capacitance, the switching noise no longer is perceptible. The valve device according to the invention hence is suitable for noise-sensitive environments, e.g. in dealing with patients.

A further advantage of the valve device according to the invention consists in that when returning into the starting condition, a valve damped by the capacitor virtually produces no pressure surge in the medium ("water hammer"). Especially in the field of microfluidics, a high number of successive water hammers of conventional valves can lead to disturbing pulses in the fluid stream in the connected fluidic line. These pulses are characterized by a short, but distinct increase of the flow velocity or the pressure acting on the fluid. The absence of these pressure disturbances achieved by means of the invention allows a better control of the flow processes. In certain microfluidic systems, such damped valves even are a necessary prerequisite, namely when stable droplets or multi-phase systems are to be produced. In this connection, too, the damping of the valve can selectively be adjusted for the requirements of the application by a suitable design of the capacitance of the capacitor.

The invention in particular is useful for valves in which the control element of the electrodynamic actuator is mechanically pretensioned into a starting condition by a return element. Depending on which switching position corresponds to the starting condition, such valves are referred to as "normally closed" (NC) or "normally open" (NO) valves. The return element generally is a spring element clamped between housing and control element.

According to a first embodiment of the valve device, the front-end electronic unit provided according to the invention is a unit constructionally separate from the valve. A separate front-end electronic unit has the advantage that it can be offered as an option to the actual valve. In addition, adaptation as well as maintenance and exchange of the front-end electronic unit are simplified.

The front-end electronic unit can, however, also be integrated into the electrodynamic actuator of the valve. The device thereby becomes distinctly more compact and can be handled more easily. The integration of the front-end electronic unit generally is unproblematic, as only few electrical components—in the simplest case only a suitably designed capacitor—must be accommodated in the housing of the actuator.

According to a first particular aspect of the invention, the front-end electronic unit includes a switching device with which the voltage applied to the coil can be reversed. The switching device provides for an accelerated return of the control element into the starting condition. A reversal of the voltage leads to the fact that the direction of the current flowing through the coil is reversed abruptly, while the control element is in the switching condition, so that suddenly a force supporting the return element acts on the control element. The Lorentz force provided in addition to the mechanical restoring force is advantageous in particular in not pressure-compensated valve mechanisms, as on closing of the valve (starting condition) a force must be exerted against the medium pressure. In particular in media-separated diaphragm valves, this leads to an increased switching time as compared to the short switching time on opening of the valve (switching condition), in which the medium pressure has a supporting effect.

The front-end electronic unit preferably includes at least one signal input. This provides for connecting the front-end electronic unit with a control device which via the signal line can determine the processes in the front-end electronic unit.

According to the invention, a diode can also be provided in the front-end electronic unit of the valve device instead of the capacitor.

In this case, the switching times can be influenced selectively by at least one resistor which is connected in series with the diode.

The invention also provides a method for controlling a valve having an electrodynamic actuator which includes a movably mounted control element having a coil and a magnet arrangement immovable relative to the coil. A driving force caused by energization of the coil and transmitted to the control element substantially is linearly dependent on the current intensity. The method according to the invention provides that, upon actuation (controlling) of the electrodynamic actuator, during energization of the coil by a voltage source, a capacitor connected in parallel to the coil is charged. After termination of the energization by the voltage source the coil is energized further by a discharge of the capacitor.

Concerning the damping effect and the further advantages of the valve control method according to the invention reference is made to the above observations on the valve device according to the invention.

As indicated already, the method according to the invention is suitable in particular for valves in which the control element is pretensioned into a starting condition and the driving force acts against the pretension (NC and NO valves).

According to the first particular aspect of the invention, the valve control method provides that for an accelerated return of the control element from a switching condition into the starting condition the voltage applied at the coil is reversed. As explained already, the current flow through the coil thereby is reversed, so that the Lorentz force acts in the opposite direction, i.e. in direction of the starting condition, and is added to the mechanical pretension of the return element.

Since the capacitor connected in parallel to the coil is an obstacle to the reversal of the voltage, it should be removed from the actuation of the electrodynamic actuator during the accelerated return of the control element. This means that at least for the period in which the reversed voltage is applied at the coil, the capacitor is deactivated by a switch or the like.

According to a second particular aspect of the invention, the valve control method provides that for an accelerated switching of the control element from the starting condition into a switching condition the voltage applied at the coil briefly is raised above a nominal voltage of the coil. (The nominal voltage of the coil is the value of the electric voltage in normal operation as specified by the manufacturer or supplier. The same applies for the nominal current). Such overexcitation is harmless for the coil, unless it is permanently exposed to the increased voltage. For the switching operation, however, it is sufficient to only output a short voltage pulse to the coil.

In general, the accelerated switching into the starting condition (by overexcitation) and the above-described accelerated return into the starting condition (by pole reversal) are advantageous in particular in applications in which high switching speeds are required, e.g. during industrial printing or dosing.

For briefly increasing the voltage, the capacitor connected in parallel to the coil can be utilized.

In principle, the first and the second particular aspect of the invention (accelerated return into the starting condition and accelerated switching into the switching condition) can however also be realized independent of the presence of a capacitor connected in parallel to the coil.

DETAILED DESCRIPTION OF THE INVENTION

Figure 1:
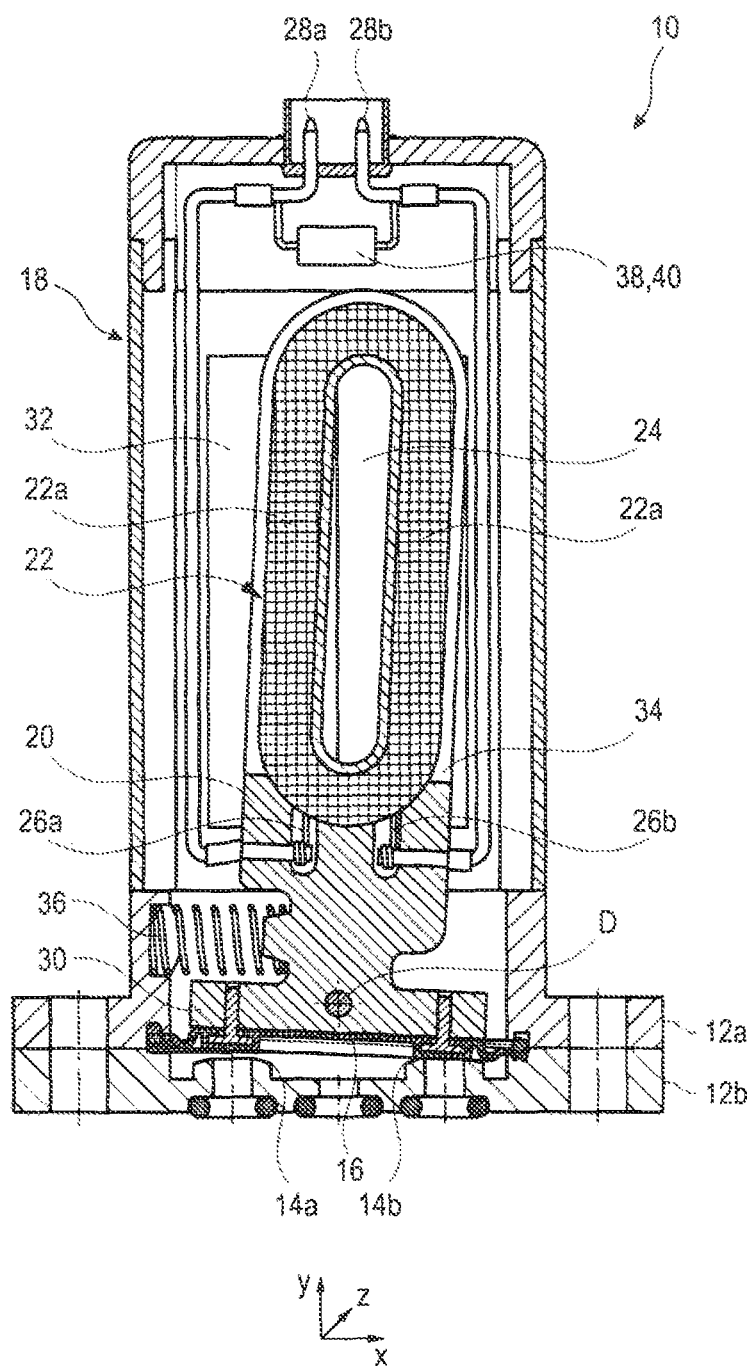
FIG. 1 shows a sectional view of a valve device of the invention according to a first embodiment.

FIG. 1 by way of example shows an embodiment of a media-separated valve 10, here a micro valve, with an electrodynamic actuator. The electrodynamic actuator is put onto a two-part fluid housing 12a, 12b, in which two valve seats 14a, 14b located one beside the other are formed. The valve seats 14a, 14b can alternately be opened or closed by a membrane 16 clamped between the housing halves 12a, 12b or by stamps or other sealing elements inserted therein.

The electrodynamic actuator comprises an actuator housing 18 in which a movable control element and an immovable magnet arrangement are accommodated. The control element substantially is formed of a coil carrier 20 of a non-magnetic material and a coil 22 of a copper wire wound onto the coil carrier 20 or otherwise firmly connected with the same, i.e. the coil carrier 20 and the coil 20 always move together.

The coil 22 comprises a plurality of windings around a non-soft-magnetic core 24 (air or another non-magnetic material) with a middle axis extending in direction z. The exemplary embodiment described here hence is an air coil.

The longitudinal axis of the coil 22 present in the form of two spaced complementary semicircles with a linear middle piece connecting the semicircles extends in a direction y vertical to the z-direction. The winding ends 26a, 26b of the coil 22 are guided through the coil carrier 20 and via electric conductors connected with two electric terminals 28a, 28b designed as pins on the upper end face of the actuator housing 18. In this embodiment, the electric terminals 28a, 28b are directly connected with a control device for actuating the electrodynamic actuator, which will be discussed in more detail below.

The coil carrier 20 in turn is firmly connected with a rocker 30 or integrally merges into a rocker 30 which is rotatably mounted about an axis of rotation oriented parallel to the z-direction. The rocker 30 is formed as two-armed actuating lever which cooperates with the membrane 16 or the stamps.

In the illustrated exemplary embodiment, the magnet arrangement is formed of four cuboid permanent magnets, of which only two permanent magnets 32, 34 are shown in the sectional representation of FIG. 1. The two permanent magnets 32 are arranged one beside the other on the one side of a longitudinal gap, in which the control element is located, in a direction x vertical to the directions y and z. On the opposite side of the longitudinal gap not visible in FIG. 1, two further permanent magnets are provided in the same arrangement. The permanent magnets are oriented such that their longitudinal axes extend parallel to the longitudinal axis direction y of the coil 22 and that in the directions x and z always opposite poles (north, south) face each other.

With respect to the direction x, two magnetic fields arranged one beside the other with opposite orientation (opposite main directions) thus are formed, whose field lines each for the most part traverse the longitudinal gap in the direction z parallel to the axis of rotation D. For the sake of simplicity, the indicated directions (left, right, etc.) used below refer to the representation of FIG. 1. Accordingly, the left magnetic field of the permanent magnets facing each other on the left side penetrates the left half 22a of the coil 22, while the right magnetic field of the permanent magnets facing each other on the right side penetrates the right half 22b of the coil 22.

In the currentless starting condition of the electrodynamic actuator, a return element 36 in the form of a coil spring clamped between the actuator housing 18 and the coil carrier 20 mechanically pretensions the rocker 30 into a valve position in which according to FIG. 1 the right valve seat 14b is closed, while at the same time the left valve seat 14a is cleared. This valve position here represents the starting condition of the valve 10.

When the coil 22 is charged with direct current via the electric terminals 28a, 28b, the current flow directions in the right and left halves 22a, 22b of the coil 22 are just as opposite as the directions of the left and the right magnetic field. With "correct" polarity of the applied voltage, a Lorentz force directed to the left acts on both coil halves 22a, 22b. The control element thereby is pivoted in anti-clockwise direction about the axis of rotation into a switching condition against the mechanical pretension of the return element 36. In this switching condition, the right valve seat 14b is open and the left valve seat 14a is closed. As soon as the current is switched off, the Lorentz force is eliminated and the return element 36 again urges the control element back into the starting condition.

The overall force acting on the control element is dependent on the strength of the magnetic fields, on the total length of the current-carrying windings of the coil 22 usable for force generation in the magnetic fields, on the current intensity and on the size of the longitudinal gap between the opposed permanent magnets.

Subsequently, the electric actuation of the valve 10 will be described, wherein the same is not limited to the above-described embodiment of the valve 10, but generally is applicable to valves with an electrodynamic drive. In particular, the valve actuation also is suitable for valves with only one valve seat which is selectively cleared or closed.

Figure 2:
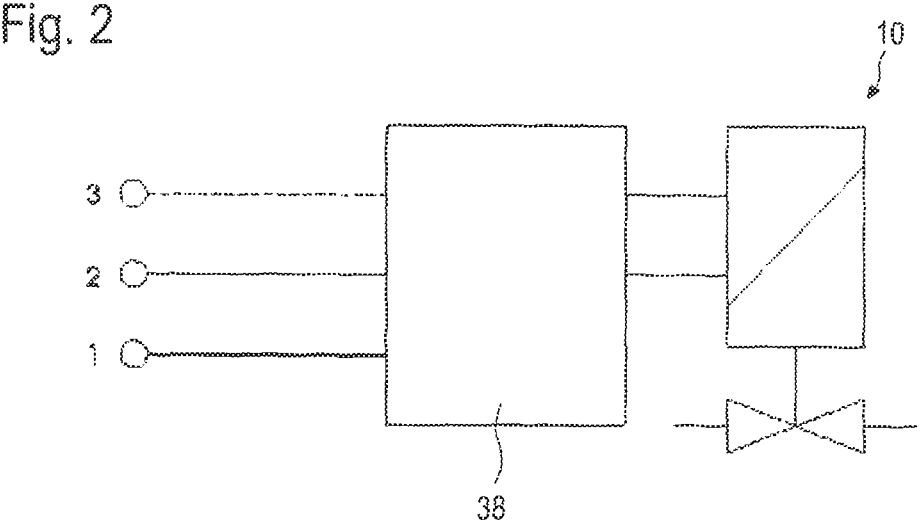
FIG. 2 shows a circuit diagram of a valve device of the invention according to a second embodiment.

FIG. 2 shows a circuit diagram with a valve 10, which includes an electrodynamic actuator, and a front-end electronic unit 38 which is an essential part of the valve actuation. The front-end electronic unit 38 has three inputs, two of which are used for supplying voltage which is provided by an external voltage source (not shown). The third input is a signal input connected with a control device (not shown) for controlling the processes in the front-end electronic unit 38.

The front-end electronic unit 38 is connected with the electrodynamic actuator, more exactly with the electric terminals 28a, 28b or the winding ends 26a, 26b of the coil 22. The front-end electronic unit 38 among other things provides for the following three switching variants, which differ from the usual switching operations without front-end electronic unit 38: 1) Damped switching operations, 2) Accelerated return into the starting condition, and 3) Accelerated switching from the starting condition.

Figure 3:
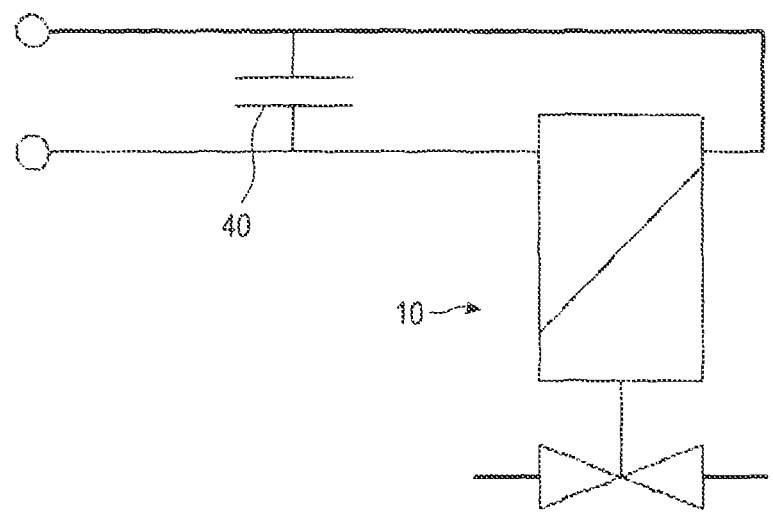
FIG. 3 shows a circuit diagram of a valve device of the invention according to the first embodiment.

With regard to the damping of the switching operations, a capacitor 40 connected in parallel to the coil 22 is provided in the front-end electronic unit 38. In the simplest case, this results in a circuitry as it is shown in FIG. 3.

The front-end electronic unit 38 can be a separate unit, as indicated in FIG. 2. Alternatively, the front-end electronic unit 38 can, however, also be integrated into the electrodynamic actuator of the valve 10. FIG. 1 by way of example shows a simple configuration in which the integrated front-end electronic unit 38 substantially consists only of the capacitor 40, which here is connected with the two electric terminals 28a, 28b.

Possible further components of the front-end electronic unit 38 will not be discussed in detail at this point.

Figure 4:
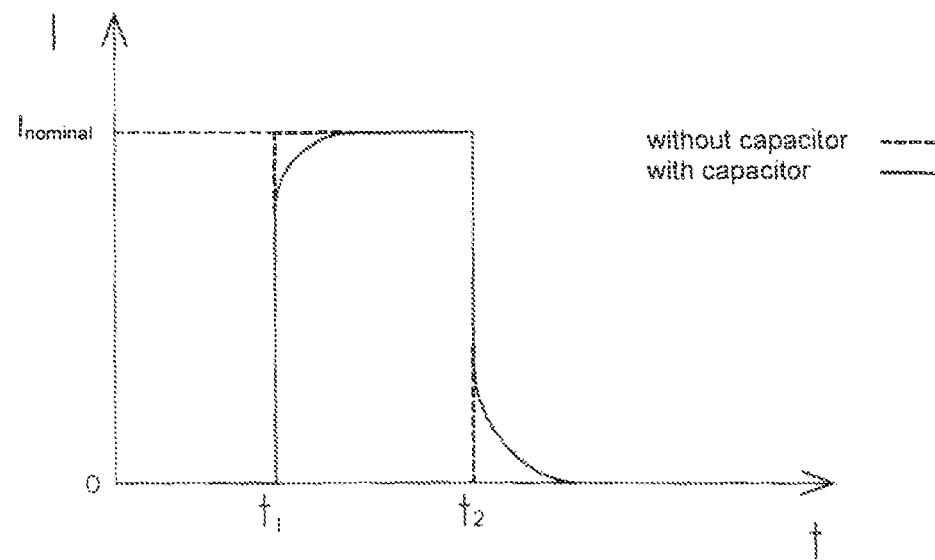
FIG. 4 shows two cycle duties of a valve of a valve device according to the invention and a valve device according to the prior art in a current-time diagram.

The broken curve in FIG. 4 shows two typical, successive switching operations of the valve 10 in a diagram in which the current flow I through the coil 22 is plotted over the time. At the time t1, a nominal voltage $U_{nominal}$ specified for the coil 22 is applied to the actuator by the external voltage source, more exactly applied to the electric terminals 28a, 28b connected with the coil ends 26a, 26b of the coil 22. As described above, the valve 10 thereupon switches from the starting condition into the switching condition by overcoming the mechanical pretension of the return element 36.

As can be taken from the diagram of FIG. 4, the current does not directly rise to the nominal value $I_{nominal}$ after the nominal voltage $U_{nominal}$ is applied. This is due to the fact that the capacitor 40 connected in parallel to the coil 22 is charged, which leads to a short delay. As long as the nominal voltage $U_{nominal}$ is applied, the valve 10 remains in the switching condition.

When the voltage of the external voltage source then is switched off at a time t2, the valve 10 switches back into the starting condition. However, the charged capacitor 40 effects that the voltage U at the coil 22 and the current flow I do not abruptly drop to zero. Rather, the capacitor 40 continues to supply the coil 22 with current also after switching off, until the capacitor 40 is discharged completely. On discharging the capacitor 40, the voltage U—and hence also the current intensity I—decreases exponentially. The exponential discharge is shown in FIG. 4 with the continuous line, while for comparison the broken line represents an abrupt switch-off without capacitor at $t_2$.

The controlled, "soft" decrease of the current intensity leads to a damped switching operation, i.e. the movement of the control element selectively is slowed down shortly before reaching the starting condition. Owing to the damping, virtually no switching noise is to be heard any more. In practice, the switching time is delayed due to damping to e.g. 15 milliseconds, when the usual switching time without damping amounts to about 1 to 5 milliseconds. A similar switching characteristic in reversed form and a comparable delay are obtained beforehand on switching into the switching condition.

Figure 5:
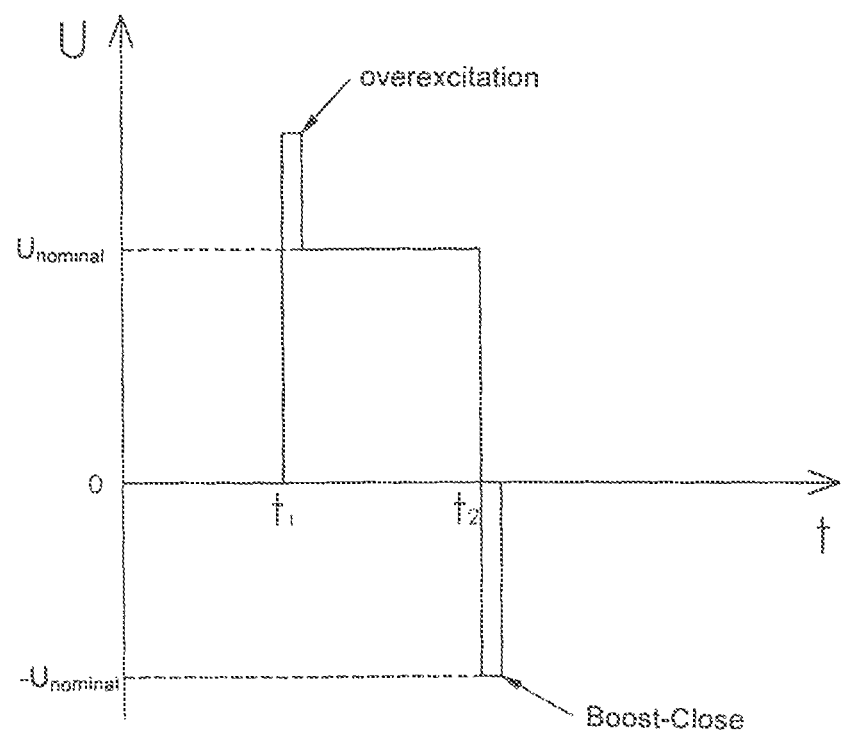
FIG. 5 shows two supported cycle duties of a valve of a valve device according to the invention in a voltage-time diagram.

When no damped, but an accelerated return into the starting condition of the valve 10 is desired, the front-end electronic unit 38 can perform another measure. The nominal voltage $U_{nominal}$, which is applied at the coil 22, in order to hold the control element in the switching position against the pretensioning force of the return element 36, is reversed for a short time. At the desired switch-back time t2, that electric terminal 28a, 28b which had been connected with the plus pole of the voltage source is connected to the minus pole or ground, and vice versa. This scenario is represented in the right part of the diagram of FIG. 5.

By reversing the polarity, the current flow through the coil 22 is reversed. In this way, a Lorentz force is generated, which acts in opposite direction and thus supports the return element 36. Due to the increased restoring force, the return of the control element into the starting condition is accelerated. For an optimum utilization of this effect, the reverse nominal voltage $-U_{nominal}$ should be applied at the coil 22 at least until the control element safely has again returned into its starting condition.

For reversing the polarity, a switching device is provided in the front-end electronic unit 38, for example in the form of a bridge circuit. The switching device only functions without the capacitor 40, i.e. the same for this time is eliminated ("switched off") from the actuating circuit for the coil 22 by suitable measures. This is not possible, however, in the variant according to FIG. 1 with the capacitor 40 hard-wired in the electrodynamic actuator.

An accelerated switching of the valve 10 from the starting condition into the switching condition likewise can be achieved by means of the front-end electronic unit 38. At the switching time a voltage distinctly exceeding the nominal voltage $U_{nominal}$ therefore is applied to the coil 22 (overexcitation). This process is represented in the left half of the diagram of FIG. 5. The increased voltage provides a higher current flow through the coil 22 and hence an increased driving force on the control element. The coil 22, however, should only briefly be charged with the higher voltage (in pulses), in order to avoid an overload or damage of the coil 22 ("burnout").

For providing the additional voltage, the capacitor 40 can be utilized. However, it also is possible to effect an upward regulation of the voltage of the external voltage source or to briefly increase the voltage at the coil 22 in some other way.

For the two last-described switching operations 2) Accelerated return into the starting condition and 3) Accelerated switching from the starting condition, the capacitor 40 is not (absolutely) necessary. In the simplest case, the front-end electronic unit 38 for these two functions is limited to a switching device or a controllable voltage source.

In principle, a diode can also be used instead of the capacitor 40, in order to achieve the switching characteristics described above. The respective switching times in this case can be adjusted in that one or more resistors are connected in series in addition to the diode.

In general, the valve actuation with the front-end electronic unit 38 in particular is suitable for media-separated valves, in particular switching valves, with electrodynamic drive, as they are used e.g. in food, analysis, laboratory or medical technology. The invention can, however, also be used in valves without separating membrane.

LIST OF REFERENCE NUMERALS

10 valve
12a, 12b fluid housing halves
14a, 14b valve seats
16 membrane
18 actuator housing
20 coil carrier
22 coil
22a, 22b coil halves
24 core
26a, 26b winding ends
28a, 28b electric terminals
30 rocker
32 permanent magnet
34 permanent magnet
36 return element
38 front-end electronic unit
40 capacitor

The invention claimed is:

1. A valve device, comprising a valve and a front-end electronic unit, wherein the valve comprises an electrodynamic actuator and one or more valve seats, wherein the electrodynamic actuator comprises a movably mounted control element and an immovable magnet arrangement, wherein the movably mounted control element comprises a coil, and wherein movement of the control element relative to a valve seat opens or closes said valve seat, wherein a driving force caused by energization of the coil via electric current and transmitted to the control element is linearly dependent on the electric current intensity, and wherein the front-end electronic unit is connected with the coil, and comprises a capacitor connected in parallel to the coil.

2. The valve device according to claim 1, wherein the control element of the electrodynamic actuator is mechanically pretensioned into a starting condition by means of a return element.

3. The valve device according to claim 1, wherein the front-end electronic unit is a unit constructionally separate from the valve.

4. The valve device according to claim 1, wherein the front-end electronic unit is integrated into the electrodynamic actuator of the valve.

5. The valve device according to claim 1, wherein the front-end electronic unit includes a switching device with which the voltage applied at the coil can be reversed.

6. The valve device according to claim 1, wherein the front-end electronic unit includes at least one signal input.

7. The valve device according to claim 1, wherein the immovable magnet arrangement of the electrodynamic actuator comprises permanent magnets.

8. The valve device according to claim 1, wherein instead of the capacitor a diode is provided.

9. The valve device according to claim 8, wherein at least one resistor is connected in series with the diode.

10. A method for controlling a valve having an electrodynamic actuator and one or more valve seats, wherein the electrodynamic actuator comprises a movably mounted control element and an immovable magnet arrangement, wherein the movably mounted control element comprises a coil and wherein movement of the control element relative to a valve seat opens or closes valve seat, wherein a driving force caused by energization of the coil via electric current and transmitted to the control element is linearly dependent on the electric current intensity, wherein, upon actuation of the electrodynamic actuator, during energization of the coil by a voltage source, a capacitor connected in parallel to the coil is charged, and wherein after termination of the energization, by the voltage source, the coil is energized further by a discharge of the capacitor.

11. The method according to claim 10, wherein for an accelerated return of the control element from a switching condition into the starting condition the voltage applied at the coil is reversed.

12. the method according to claim 10, wherein the immovable magnet arrangement of the electrodynamic actuator comprises permanent magnets.

13. The method according to claim 10, wherein the control element is pretensioned into a starting condition and the driving force acts against the pretension.

14. The method according to claim 13, wherein for an accelerated return of the control element from a switching condition into the starting condition the voltage applied at the coil is reversed.

15. The method according to claim 10, wherein for an accelerated switching of the control element from the starting condition into a switching condition the voltage applied at the coil briefly is raised above a nominal voltage of the coil.

16. The method according to claim 15, wherein for raising the voltage the capacitor connected in parallel to the coil is utilized.

17. A method for controlling a valve having an electrodynamic actuator and one or more valve seats, wherein the electrodynamic actuator comprises a movably mounted control element and an immovable magnet arrangement, wherein the movably mounted control element comprises a coil and wherein movement of the control element relative to a valve seat opens or closes valve seat, wherein a driving force caused by energization of the coil via electric current and transmitted to the control element is linearly dependent on the electric current intensity, wherein, upon actuation of the electrodynamic actuator during energization of the coil by a voltage source a capacitor connected in parallel to the coil is charged, and wherein after termination of the energization, by the voltage source, the coil is energized further by a discharge of the capacitor, wherein for an accelerated return of the control element from a switching condition into the starting condition the voltage applied at the coil is reversed, wherein for reversing the voltage the capacitor connected in parallel to the coil is removed from the actuation of the electrodynamic actuator.

18. The method according to claim 17 wherein the control element is pretensioned into a starting condition and the driving force acts against the pretension.

* * * * *